Patented Mar. 24, 1925.

1,530,533

UNITED STATES PATENT OFFICE.

KASPAR WINKLER, OF ALTSTETTEN, NEAR ZURICH, SWITZERLAND.

WATERPROOFING COMPOSITION.

No Drawing.   Application filed March 28, 1921. Serial No. 456,200.

*To all whom it may concern:*

Be it known that I, KASPAR WINKLER, a citizen of Switzerland, residing at Altstetten, near Zurich, in the Canton of Zurich and Republic of Switzerland, have invented certain new and useful Improvements in Waterproofing Composition, of which the following is a specification.

The agents hitherto employed for waterproofing mortar, cement and concrete, or similar purposes, can be generally divided into the following groups:—

1. Tar, asphalt, pitch, colophony, paraffin, ozokerite and the like, in the melted or dissolved state and if necessary emulsified (tar also undiluted), are either incorporated with the mortar or cement before use, or preferably applied hot as a coating upon the surfaces to be dried.

2. The imperviousness is due to the formation of insoluble oleate salts which is mostly produced by alternate coating with a soap solution and a solution of alum, aluminium acetate, calcium chloride and the like, and more rarely by adding these substances in making-up the mortar or the like. This also includes the admixture of linseed oil or varnish to mortar or cement containing lime-gelatine.

3. The waterproofing is effected by adding casein or other albuminous substances, in many cases with an addition, or with a subsequent application of a solution of calcium chloride. The action is due to the fact that the casein or the albuminous substances form insoluble compounds with lime. This fact is utilized mainly for producing waterproof paints and distempers.

4. The formation of insoluble silicates and in many cases also of fluor-silicates in the mortar and cement is effected by mixing together soluble silicate salts or soluble fluor-silicate salts, and eventually subsequent painting over with a solution of calcium chloride. The treatment consists often merely in successive coatings, in which case the solution of chloride of calcium may again be omitted.

All these agents and processes are attended by drawbacks that restrict their efficiency and utility in a considerable degree. The agents mentioned under 1 have compared with all the others, the disadvantage that they have no affinity to the components of the mortar or cement, and in these materials they constitute completely foreign component substances which do not share in the cohesion-union and consequently loosen the cohesion, that is to say, reduce the strength. The other agents have only a practical importance in so far as it is a question of making paints or distempers. The agents to be used in the form of a paint are consequently entirely out of the question for the purpose in view, because in the best circumstances they allow only of producing a quite superficial waterproofing of the structures, and the coverings thus produced mostly decompose, scale off or get washed off after a short time.

In order that waterproof mortars and cements (smooth and rough casting) shall satisfy all requirements of practice: (1) they should be capable of adhering to a thoroughly soaked foundation without previous preparation (draining the underground or carrying off water coming from a height, thorough cleaning, etc.), for instance upon sooty walls over which water trickles, in tunnels, deep cellars, shafts; (2) they should be capable of being regulated as regards the time they require for setting or binding according to circumstances, and if necessary be capable of setting so quickly that a coating, covering of cement or the like, shall not be washed away or forced off at once by exuding water; (3) they should be capable of producing a perfect and permanent protection against moisture and water; (4) they should have at least the same cohesion and hardness as ordinary mortar and cement.

The hereinafter described means allows of producing waterproof mortar and cement which will satisfy the above stated requirements. For the manufacture of the same a stiff paste is prepared by bringing together about 3 parts of potassium silicate solution of 10° Bé., 2 to 2½ parts of specially, that is to say, freshly prepared calcium chloride solution of 7°–10° Bé., and thoroughly mixing the resulting colloid so obtained with 8 to 15% of its weight of dust-fine extremely pure calcium carbonate, and 5 to 8% of fat or oil emulsified with a 7 to 18% solution of potassium hydrate. As calcium carbonate there may be employed for this purpose the purest limestone (99%). Chalk has an injurious effect upon the hardness of the mortar and cement prepared with this waterproofing agent. Carbide mud on the contrary when used instead of calcium carbonate, gives a good result.

The resulting stiff paste constitutes a preparation which will keep for a long time without alteration, and which when stirred in suitable quantity, on an average about 1 kg. to at most 12 litres, in the making up water, allows of producing an impervious mortar, cement and concrete.

In many cases however, the problem is not wholly solved with the waterproofing alone. There is not much gained if it is not possible to impart to this waterproof mortar and cement, those further properties which under more difficult conditions first render them useful. Namely, it is often required that the mortar or cement shall have an extraordinary power of adhesion, and shall set very rapidly, so to speak instantaneously, shall acquire great strength in an extremely short time, and although last this is not the least important requirement, namely, that it shall retain all these peculiar properties even when under water and under the maximum water pressure. Moreover, it is often necessary that such mortar and cement shall be proof in a high degree against cold and heat, and also (for instance in gasworks) against ammonia.

In order to impart these properties to the mortar or cement, or to increase these properties to the required degree, the percentage of heating constituents of the waterproof composition is increased.

The described increase of the percentage may be applied at the same time to several constituents of the waterproof composition. The only thing which must be excluded from any increase whatever is the above mentioned quantity of fat or oil and lime, the quantities of which should rather be reduced.

Any alteration in the original constitution of the waterproofing composition by increasing the percentage of one or the other or of a number of components runs the risk of causing undesirable subsidiary phenomena, such as efflorescence, decomposition, cracking. In order to prevent this it is necessary to add at the same time from 3 to 5% of manganese dioxide. The presence of said substance prevents the injurious subsidiary phenomena already mentioned, without prejudicing in any way the goodness of the mortar or cement.

Mortar, cement, concrete and the like bodies prepared with the improved waterproofing composition which has had its properties adjusted if required in accordance with the circumstances, allow of producing a perfect and permanent dryness of buildings under the most difficult conditions. For instance it is possible with the help of this waterproofing composition to apply without difficulty a perfectly impervious, extremely dense, hard coat which will resist water pressure and is at the same time proof against cold and heat, upon wet masonry, and even upon sooty foundations traversed by great veins of water, such as tunnel walls, shafts, and thus effect such a certain drying of these structures which cannot be attained with any of the means hitherto known.

What I claim is:—

1. A process for rendering mortar, cement, concrete and the like waterproof, consisting in stirring in the making-up water a composition of potassium silicate solution, calcium chloride solution, dust-fine, pure calcium carbonate, and oil emulsified with a potassium hydrate solution.

2. A process for rendering mortar, cement, concrete and the like waterproof, consisting in stirring in the making-up water a composition of about 3 parts of 10° Bé. potassium silicate solution, 2 to 2½ parts of freshly made calcium chloride solution of 7° to 10° Bé., and 8 to 15% of the weight of the colloid of dust-fine, extremely pure calcium carbonate, and 5 to 8% of oil emulsified with 7 to 18% of potassium hydroxide solution, the paste thus produced being stirred in the proportion of on an average about 1 kg. to at most 12 litres in the making-up water.

3. A process for rendering mortar, cement, concrete and the like waterproof, consisting in stirring in the making-up water a composition of potassium silicate solution, a calcium chloride solution, dust-fine pure calcium carbonate and oil emulsified with a potassium hydroxide solution, further characterized by the feature that the percentage of the calcium chloride solution is greater in amount than the other constituents put together and that from 3–5% of manganese dioxide are incorporated with said composition, the mixture thus obtained being stirred in the proportion of on an average about 1 kg. to at most 12 litres in the gauging water.

4. A process as claimed in claim 1, in which manganese dioxide forms a part of the composition agitated with the original water content.

In testimony whereof I have affixed my signature in presence of two witnesses.

KASPAR WINKLER.

Witnesses:
 CHR. MILLIEN,
 HERMANN HUBER.